United States Patent Office 3,119,820
Patented Jan. 28, 1964

3,119,820
OPTICAL WHITENING AGENTS OF THE
STILBYL TRIAZOLE TYPE
Dennis A. W. Adams and Asim Kumar Sarkar, Leeds,
England, assignors to Hickson & Welch Limited, Castleford, England, a British company
No Drawing. Filed May 3, 1961, Ser. No. 107,304
Claims priority, application Great Britain May 4, 1960
10 Claims. (Cl. 260—240)

This invention is concerned with improvements in or relating to optical whitening agents. It is more particularly concerned with certain new compounds of use as optical whitening agents.

Optical whitening agents have in recent years found extensive use in the treatment of textiles particularly during washing and are designed to counteract the yellow or off-white colour which white textiles may possess, especially after repeated washing. Such optical whitening agents also tend to improve coloured textiles as they impart a general brightness to them. They are also widely used to impart whiteness to other material of cellulosic nature, particularly paper.

It is an object of the invention to provide new optical whitening agents having a wide range of application and in particular good balanced substantivity to diverse types of textile fabrics.

According to the invention, there are provided, compounds, useful as optical whitening agents, of the general formula:

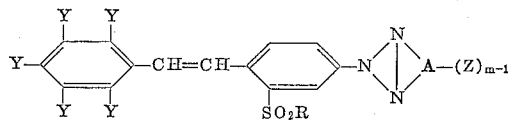

in which the groups Y, which may be the same or different, each represent hydrogen atoms or non-chromophoric or non-auxochromic substituents.

R represents a straight or branched chain alkylene group (preferably containing at least two carbon atoms) containing at least one hydrophilic substituent;

A is a mono-or poly-nuclear aromatic or heterocyclic residue two vicinal carbon atoms of which form part of the triazole ring and derived, for example, from a benzene, naphthalene, acenaphthene, indazole (5- or 6-) or pyrazole residue;

Z is a hydrophilic group and $m$ is an integer from 1–3.

The hydrophilic group on A may be e.g. an —$SO_3H$ or a —COOH group (which may if desired be in salt form, for example in alkali-metal salt form).

The compounds according to the invention are in general well dispersible in water or detergent solutions and exhibit a good balanced substantivity to a range of textile fibres. Those compounds which contain no hydrophilic group such as a —COOH or —$SO_3H$ group in the substituent A are particularly useful for application to hydrophobic synthetic or semi-synthetic fibres such as polyamide and cellulose triacetate fibres, and particularly polyester fibres. Polyester fibres are becoming of increasing importance but their nature is such that to produce optical whitening agents having good substantivity for them has in general been difficult. The presence of a hydrophilic group in the residue A decreases the substantivity of the compound to polyester fibres but improves substantivity to cellulosic fibres, whilst substantivity to polyamide fibres and wool remains substantially unaffected. The compounds according to the invention thus represent a group of optical whitening agents having a particularly versatile range of use.

Compounds of the above formula are preferred in which R contains a hydroxy, alkoxy, cyano, carboxy, carbalkoxy, polyoxyalkyl or a hydroxy group partially esterified with a polycarboxylic acid and examples of such groups are the following —$CH_2CH_2COOR_2$
—$CH_2CH_2CN$
—$CN_2COOR_2$
—$CH_2CH_2O.CO.CH=CH.COOR_2$
—$CH_2.CH_2.CH_2COOR_2$
—$CH_2CH_2O.CO.CH_2CH_2.COOR_2$
—$(CH_2CH_2O)_nR_2$
—$(C_3H_6O)_nR_2$
—$CH_2CH(OR_2)CH_2OR_2$
—$CH_2CH(OH)CH_2OCH_2CH_2OCH_3$ where $R_2$ is hydrogen or an alkyl group e.g. methyl, ethyl, propyl, isopropyl, butyl etc. and $n$ is an integer from 1–10. The invention also includes the sulphuric and phosphoric acid esters of those compounds containing a hydroxy group in the group R.

Where the groups Y are other than hydrogen these can, for example, be lower alkoxy groups, e.g. methoxy or ethoxy groups, or halogen atoms, e.g. chlorine, bromine or iodine atoms. Those compounds are preferred in which such non-hydrogen substituents are present in the ortho-or para- position relative to the side chain.

Specific preferred compounds are those prepared according to the examples set out below, including both the free acids and alkali metal salts thereof in appropriate instances.

The compounds according to the invention can be incorporated in soaps, detergents, washing agents and other textile auxiliaries, or may be incorporated in treating baths for the treatment of materials, the appearance of which it is desired to improve. Examples of representative compositions are given below.

The compounds according to the invention may be prepared by any convenient method, which method will in general involve the conversion of a sulphinic acid group (—$SO_2H$) into a group —$SO_2R$ (in which R has the above stated meaning), if desired, followed by modification of the group R to give a further group R of a different nature, such conversion being effected at any convenient stage during the production of the final compounds, the stage at which conversion is effected being determined to some extent by the nature of the group R which it is desired to introduce.

According to a feature of the invention, therefore, we provide a process for the production of compounds of the general Formula I which comprises treating a sulphinic acid compound of the general formula:

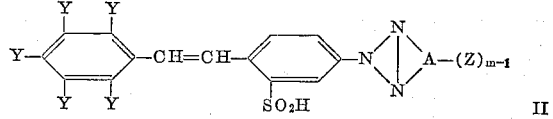

(in which Y, A, Z and $m$ have the above-stated meanings) to convert the —$SO_2H$ group into a group —$SO_2R$ (in which R has the above-stated meaning), the resulting compound being if desired further treated to modify the nature of the group R.

In principle to effect conversion of the group $SO_2H$ to a group $SO_2R$ one may react the sulphinic acid group-containing compound with a compound which on reaction therewith will replace the hydrogen atom of the sulphinic acid group by a group R suitable compounds being in general compounds possessing an epoxide group or double bond unsaturation or compounds which will, under suitable conditions react with the compound of Formula II with the elimination of acid, for example aliphatic halohydrins.

Suitable epoxide group-containing compounds include in particular alkylene oxides and derivatives thereof containing an epoxide group, suitable alkylene oxides including for example ethylene oxide, propylene oxide and butylene oxide. Suitable derivatives thereof include, for example, glycidol and other epoxide group-containing alcohols. Esters of such alcohols may also be used. In this manner one may replace the hydrogen atom of the sulphinic acid group by a group R in which R represents one of the following groups

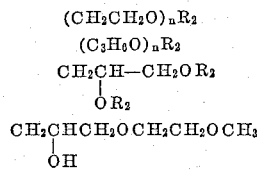

(in which $R_2$ and $n$ have the above stated meanings).

The reaction of the compound of Formula II with the epoxide group-containing compounds may be carried out under any suitable conditions, but it is in general preferred to employ those conditions disclosed in copending application No. 107,305 filed May 3, 1961, now U.S. Patent 3,086,057, granted April 16, 1963 for this reaction as applied to the production of certain new compounds of the formula therein specified. These compounds may with advantage be used as intermediates in the production of the compounds according to the present invention as is described more fully below. Conditions for the reaction of sulphinic acid group-containing compounds with an aliphatic halohydrin are also disclosed in the said copending application, and said conditions may, in general, also be used for the reaction according to the invention. Suitable halohydrins include in particular chlorohydrins although other halohydrins may be used if desired, particularly suitable halohydrins including ethylene chlorohydrin, propylene chlorohydrin and butylene chlorohydrin.

By the use of halohydrins, compounds may be produced in which the hydrogen atom of the sulphinic acid group is replaced by a group R which may for example be one of the following groups $CH_2CH_2OH$
$CH_2CH(OH)CH_3$
$CH_2CH(OH)CH_2CH_3$ By the reaction of compounds having a double bond unsaturation such as, for example, acrylic acid and methacrylic acid and esters and other derivatives thereof, such as acrylonitrile, one may obtain compounds in which the hydrogen atom is replaced by one of the following groups

—$CH_2CH_2COOR_2$
—$CH_2CH_2CN$
—$CH_2CH_2COOR_2$ (in which $R_2$ has the above stated meaning). This reaction may be carried out under any suitable conditions, for example, by refluxing a mixture of the reaction components for a number of hours in an organic solvent, preferably in a suitable water-miscible organic solvent, e.g. ethanol, until the desired product is obtained which product may be recovered by cooling and recrystallization.

Compounds in which the group R contains a hydroxy group partially esterified with a polycarboxylic acid may conveniently be prepared from compounds according to the invention in which the group R contains a hydroxy group, by reaction of that compound with a polycarboxylic acid or anhydride thereof. This reaction may conveniently be carried out in an inert organic solvent, for example dimethylformamide, in the presence of a basic catalyst, for example pyridine.

In preparing compounds according to the invention it is in general convenient to effect the conversion of the —$SO_2H$ group to a group —$SO_2R$ by treatment of a compound of the general Formula II above. Alternatively, one may if desired, use a compound convertible to a compound of general Formula II as starting material.

According to the invention, therefore, there is also provided a modification of the process thereof in which a sulphinic acid compound, convertible to a compound of general Formula II, as defined above, is treated to convert the sulphinic acid group to the group —$SO_2R$, where R has the meaning defined above, and the resulting compound is converted to the desired compound of general Formula I as defined above.

Particularly preferred sulphinic acid compounds (III) are those used as starting materials for the intermediates disclosed in the copending application referred to above, that is compounds of the general formula:

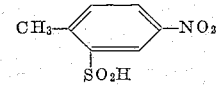    IV

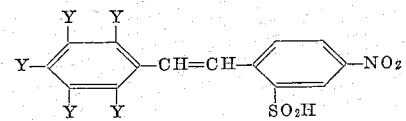    V (in which Y has the above stated meaning).

After conversion of the sulphinic acid groups present in these compounds to groups $SO_2R$, these compounds can be converted to compounds of the general Formula I by methods for the conversion of the parent sulphonic acid of a compound of the general Formula II.

Thus, for example, the —$SO_2H$ group in the compound of Formula IV above may first be converted to a group $SO_2R$ the resulting compound thus being coupled with an aromatic aldehyde to produce a compound of the Formula V in which —$SO_2H$ is replaced by the group —$SO_2R$, the resultant nitro-stilbyl compound then being reduced to convert the —$NO_2$ group to a —$NH_2$ group. The amino stilbyl compound may be diazotized and the resulting diazonium compound coupled with a compound $ANH_2$ (where A has the above stated meaning) which is free to couple in a position ortho to the amino group, to give an orthoamino azo dye which on oxidation yields a compound of the general Formula I.

The oxidation of the o-amino azo dye may be carried out under convenient conditions. Preferably, a mild oxidising agent is used for effecting the oxidation, suitable oxidising agents including alkali metal hypochlorites, e.g., sodium hypochlorite, cuprammonium sulphate or copper sulphate in the form of a soluble complex with pyridine, thionyl chloride and sulphuryl chloride. The oxidation is preferably effected at elevated temperature.

Similarly, if the conversion of the $SO_2H$ group is effected on the compound of Formula V, this may then be subjected to the appropriate process steps outlined above excluding the stage of coupling with an aromatic aldehyde as this is no longer necessary.

It should be mentioned that the stage at which the group —$SO_2H$ is converted to a group —$SO_2R$ may be important. Thus, for example, it is not possible to couple an aromatic aldehyde with a compound of Formula IV when the sulphinic acid group thereof has been converted to a group —$SO_2R$ in which R contains a terminal carboxylic acid or nitrile group and therefore such a compound is not to be considered as a suitable compound for the purpose of preparing the compounds according to the invention. What compounds are suitable for this purpose can readily be determined by experiment.

The preparation of the sulphinic acid starting materials may be effected by any desired method. A suitable method for example consists in converting the parent sulphonic acid to an acid chloride, for example by treatment with thionyl chloride or phosphorus tri- or pentachloride after which the sulphonyl chloride may be reduced to the corresponding sulphininc acid.

In order that the invention may be well understood, the following examples are given by way of illustration only. In these examples parts are by weight:

*Example 1*

The compound of the formula

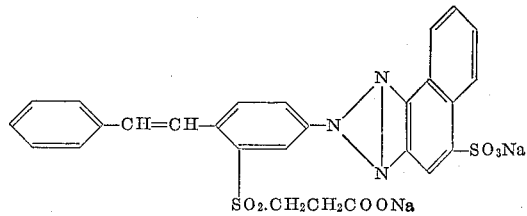

is prepared as follows:

A solution of 31.1 parts of 4-amino-(2-carboxyethyl)-sulphonyl stilbene, 4.1 parts of sodium hydroxide and 6.9 parts of sodium nitrite in 500 parts of water is indirectly diazotised at 8–10° C., with 25 parts of concentrated hydrochloric acid. The suspension of the diazo compound is coupled with a solution of 23.0 parts of sodium naphthionate in 200 parts of water. A solution of 200 parts of sodium acetate is added to control the pH during the coupling.

On completion of the coupling, the dye is filtered off, washed, dissolved in 500 parts of pyridine and refluxed with 60 parts of copper sulphate and 75 parts of ammonia in 100 parts of water, until the red colour is completely discharged.

On completion of the oxidation, the triazole is precipitated by acidification, converted to the disodium salt, and recrystallised from aqueous alcohol.

The 4-amino-(2-carboxyethyl)-sulphonyl stilbene used as starting material in this example may be prepared by the reduction of the compound of the formula:

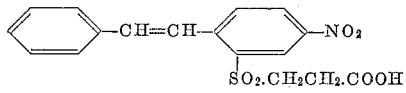

which may be prepared as follows:

4-nitro-stilbene-2-sulphonic acid (29 gms.) was dissolved in 50% aqueous ethanol (1.6 l.). The solution was then refluxed with acrylic acid (10.8 gms.) for 7 hours. On cooling the solution, the product crystallised out, and was filtered, washed and crystallised from alcohol. The product had M.Pt. 238° C.

Undyed textile material of synthetic polyamide fibres is treated in the ratio of 1:40 for 1 hour at 85° C. in a bath which contains 0.4 gm. of formic acid and 0.15 gm. of the triazole compound of this example per litre. After rinsing and drying the treated material has a considerably more white appearance than before treatment.

*Example 2*

The compound of the formula

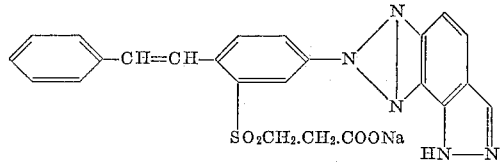

is prepared as follows:

A solution of 33.1 parts of 4-amino-(2-carboxyethyl)-sulphonyl stilbene, 4.1 parts of sodium hydroxide and 6.9 parts of sodium nitrite in 500 parts of water is indirectly diazotised at 8–10° C. by the addition of 25 parts of concentrated hydrochloric acid. The suspension of the diazo compound is coupled with a solution of 13.3 parts of 6-amino indazole in 200 parts of dilute hydrochloric acid. A solution of 200 parts of sodium acetate is added to control the pH during the coupling.

On completion of the coupling the dye is filtered off, washed, dissolved in 500 parts of pyridine and refluxed with 60 parts of copper sulphate and 75 parts of ammonia in 100 parts of water, for 5 hours.

After the oxidation the triazole is precipitated by acidification, converted to the sodium salt and recrystallised from aqueous alcohol.

*Example 3*

The compound of the formula

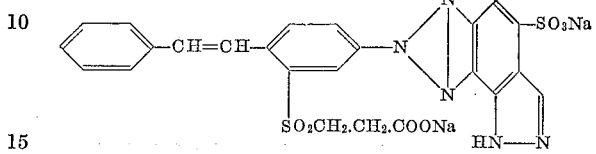

is prepared as follows:

A solution of 33.1 parts of 4-amino-(2-carboxyethyl)-sulphonyl stilbene, 4.1 parts of sodium hydroxide and 6.9 parts of sodium nitrite in 500 parts of water is indirectly diazotised at 8–10° C. by the addition of 25 parts of concentrated hydrochloric acid. The suspension of the diazo compound is coupled with a solution of 21.3 parts of 6-amino indazole 4-sulphonic acid in 300 parts of water. A solution of 200 parts of sodium acetate is added to control the pH of the reaction mixture.

On completion of the coupling the dye is filtered off, washed, dissolved in 500 parts of pyridine and refluxed with 60 parts of copper sulphate and 75 parts of ammonia in 100 parts of water, until the colour of the dye is discharged.

After the oxidation, the triazole is precipitated by acidification, converted to the disodium salt and crystallised from aqueous alcohol.

1 part of white washing of pillow cases and sheets are washed in the usual way at 90–100° C. in 10 parts of a washing liquor which contains 3 gms. of grain soap, 2 gms. of sodium carbonate and 0.003 gm. of the triazole compound of this example, per litre. A dazzling white is obtained.

*Example 4*

The compound of the formula

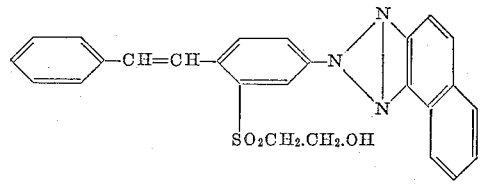

is prepared as follows:

A solution of 15.15 parts of 4-amino-2-(β-hydroxyethyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 7.15 parts of β-naphthylamine and 5 parts of hydrochloric acid in 100 parts of water and a solution of 50 parts of sodium acetate in 100 parts of water is added.

On completion of the coupling the dye is salted out, filtered off and washed with dilute hydrochloric acid.

The damp dyestuff is dissolved in 200 parts of pyridine and refluxed with 30 parts of copper sulphate in 50 parts of water and excess ammonia until the colour of the dye has been completely discharged. The crude triazole of the formula set out above is precipitated by dilution of the reaction mixture, filtered off, washed with water and recrystallised from acetic acid.

30 parts of the triazole compound described in this example are ground to a fine homogeneous powder with 60 parts of sodium bisulphate and 910 parts of a condensation product of naphthalene sulphonic acid and formaldehyde.

Fibres of polyethylene terephthalate which have been treated in a bath in a ratio of 1:30 for 30 minutes at 80–100° C. containing 2% of the above powder and 1–2 ccs. of ammonia per litre, when rinsed and dried, possess a brighter appearance than untreated material.

*Example 5*

The compound of the formula

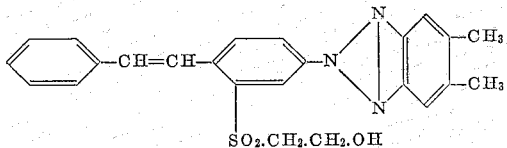

is prepared as follows:

A solution of 15.15 parts of 4-amino-2-(β-hydroxyethyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 6.85 parts of 2,4-cresidine and 5 parts of hydrochloric acid in 100 parts of water and a solution of 50 parts of sodium acetate in 100 parts of water is added.

On completion of the coupling the dye is salted out, filtered off and washed with dilute hydrochloric acid.

The damp dyestuff is dissolved in 200 parts of pyridine and refluxed with 30 parts of copper sulphate in 50 parts of water and excess ammonia until the colour of the dye has been completely discharged. The crude triazole of the formula set out above is precipitated by dilution of the reaction mixture, filtered off, washed with water and recrystallised from acetic acid.

*Example 6*

The compound of the formula

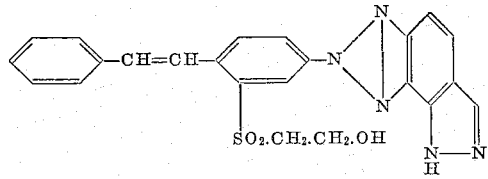

is prepared as follows:

A solution of 15.15 parts of 4-amino-2-(β-hydroxyethyl-sulphonyl)-stilbene in 150 parts of acetone is acidified by the addition of 12.5 parts of hydrochloric acid and directly diazotised with an aqueous solution of 3.45 parts sodium nitrite at 8–10° C.

The diazonium compound is coupled with a solution of 6.65 parts of 6-amino-indazole and 5 parts of hydrochloric acid in 100 parts of water is added.

On completion of the coupling the dye is salted out, filtered off and washed with dilute hydrochloric acid.

The damp dyestuff is dissolved in 200 parts of pyridine and refluxed with 30 parts of copper sulphate in 50 parts of water and excess ammonia until the colour of the dye has been completely discharged. The crude triazole of the formula set out above is precipitated by dilution of the reaction mixture, filtered off, washed with water and recrystallised from acetic acid.

*Example 7*

The compound of the formula

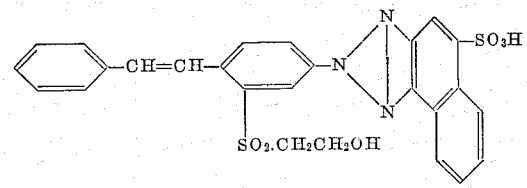

is prepared as follows:

A solution of 15.15 parts of 4-amino-2-(β-hydroxyethyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 12.25 parts of sodium naphthionate in 200 parts of water. A solution of 50 parts of sodium acetate in 100 parts of water is added to maintain the pH of the solution at 7–8. After the coupling the azo-dye is salted out, filtered and washed with brine. The damp dyestuff is slurried with 1,000 parts of water, basified to pH 10 with sodium hydroxide solution, and oxidised by passing air through the heated, stirred slurry in the presence of 1 part of copper sulphate and excess ammonia. When the colour of the dye is completely discharged the crude triazole of the formula set out above is filtered off and recrystallised from aqueous acetone.

*Example 8*

The compound of the formula

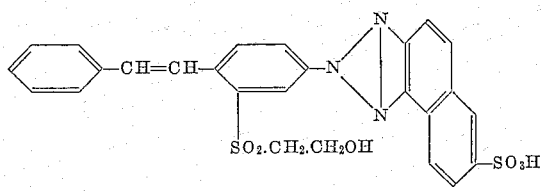

is prepared as follows:

A solution of 15.15 parts of 4-amino-2-(β-hydroxyethyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 12.25 parts of sodium 2-naphthylamine-6-sulphonate in 200 parts of water. A solution of 50 parts of sodium acetate in 100 parts of water is added to maintain the pH of the solution at 7–8. After the coupling the azo-dye is salted out, filtered and washed with brine. The damp dyestuff is slurried with 1,000 parts of water, basified to pH 10 with sodium hydroxide solution, and oxidised by passing air through the heated, stirred slurry in the presence of 1 part of copper sulphate and excess ammonia. When the colour of the dye is completely discharged the crude triazole of the formula set out above is filtered off and recrystallised from aqueous acetone.

*Example 9*

The compound of the formula

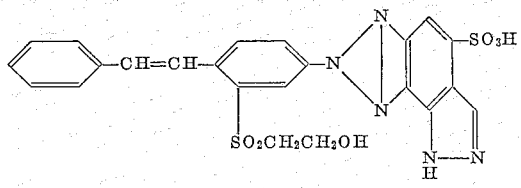

is prepared as follows:

A solution of 15.15 parts of 4-amino-2-(β-hydroxyethyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 10.65 parts 6-amino-indazole-4-sulphonic acid in 100 parts of water and a solution of 50 parts of sodium acetate in 100 parts of water is added.

On completion of the coupling the dye is salted out, filtered and washed with water. The damp azo-dye is dissolved in 200 parts of pyridine and refluxed with 30 parts of copper sulphate in 50 parts of water and excess ammonia until the red colour is completely discharged. The triazole of the formula set out above is isolated by dilution of the reaction mixture and recrystallised from aqueous acetic acid.

Example 10

5 parts of the product of Example 4, 1 part of maleic anhydride, 50 parts of dimethylformamide, and 2.5 parts of pyridine are heated together at 100–120° C. for 30 minutes. The reaction mixture is mixed with 500 parts of water and made barely acid to Congo Red paper by the addition of hydrochloric acid. The mixture is filtered and the solid washed with water. 6 parts of a product is obtained which consists chiefly of material of the following formula

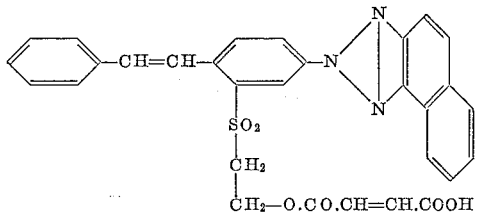

Example 11

The compound of the formula

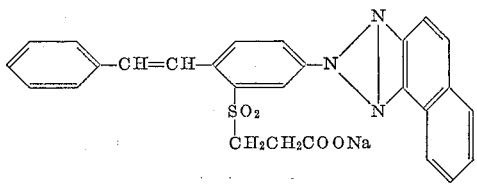

is prepared as follows:

A solution of 31.1 parts of 4-amino-(2-carboxy-ethyl-suphonyl)-stilbene, 4.1 parts of sodium hydroxide and 6.9 parts of sodium nitrite in 500 parts of water is indirectly diazotised at 8–10° C., with 25 parts of concentrated hydrochloric acid. The suspension of the diazo compound is coupled with a solution of 14.3 parts of β-naphthylamine and 10 parts of hydrochloric acid in 200 parts of water, and a solution of 100 parts of sodium acetate in 200 parts of water is then added. On completion of the coupling, the dye is filtered off, washed, dissolved in 500 parts of pyridine and refluxed with 60 parts of copper sulphate and 75 parts of ammonia in 100 parts of water, until the colour is completely discharged.

On completion of the oxidation, the triazole is precipitated by acidification, and the sodium salt is recrystallised from aqueous alcohol.

Example 12

The compound of the formula

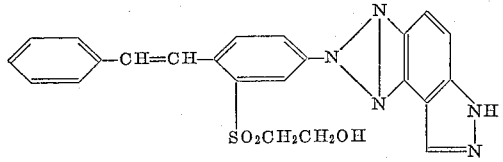

is prepared as follows:

A solution of 15.15 parts of 4-amino-2-(β-hydroxy-ethyl-sulphonyl)-stilbene in 150 parts of acetone is acidified by the addition of 12.5 parts of hydrochloric acid and directly diazotised with an aqueous solution of 3.45 parts of sodium nitrite at 8–10° C. The diazonium compound is coupled with a solution of 6.65 parts of 5-amino-indazole, and 5 parts of hydrochloric acid in 100 parts of water is added. On completion of the coupling, the dye is salted out, filtered off and washed with dilute hydrochloric acid.

The damp dyestuff is dissolved in 200 parts of pyridine and refluxed with 30 parts of copper sulphate in 50 parts of water and excess ammonia until the colour of the dye has been completely discharged. The reaction mixture is acidified with acetic acid and the crude triazole precipitated by dilution. It is filtered off, washed with water and recrystallised from aqueous ethanol.

Example 13

The compound of the formula

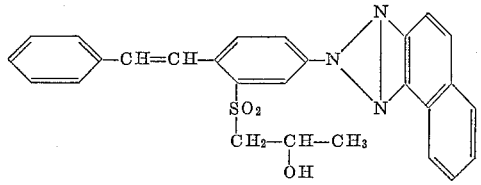

is prepared as follows:

A solution of 15.85 parts of 4-amino-2-(β-hydroxy-propyl-sulphonyl)-stilbene in 150 parts of acetone is acidified by the addition of 12.5 parts of hydrochloric acid and directly diazotised with an aqueous solution of 3.45 parts of sodium nitrite at 8–10° C. The diazonium compound is coupled with a solution of 7.15 parts of β-naphthylamine and 5 parts of hydrochloric acid in 100 parts of water and a solution of 50 parts of sodium acetate in 100 parts of water is added. On completion of the coupling the dye is salted out, filtered off and washed with dilute hydrochloric acid.

The damp dyestuff is dissolved in 200 parts of pyridine and refluxed with 30 parts of copper sulphate in 50 parts of water and excess ammonia until the colour of the dye has been completely discharged. The crude triazole is precipitated by dilution of the reaction mixture, filtered off, washed with water, and recrystallised from acetic acid.

Example 14

The compound of formula

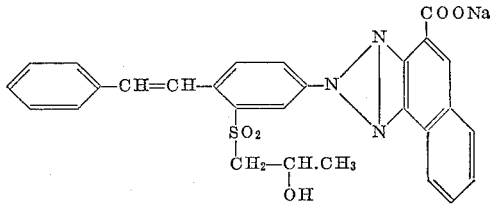

is prepared as follows:

A solution of 15.85 parts of 4-amino-2-(β-hydroxy-propyl-sulphonyl)-stilbene in 150 parts of acetone is acidified by the addition of 12.5 parts of hydrochloric acid and directly diazotised with an aqueous solution of 3.45 parts of sodium nitrite at 8–10° C. The diazonium compound is coupled with a solution of 9.35 parts of 3-amino-2-naphthoic acid and 2.65 parts of sodium carbonate in 250 parts of water, and a solution of 50 parts of sodium acetate in 100 parts of water is then added. On completion of the coupling the dye is salted out, filtered off and washed with water.

The damp dyestuff is dissolved in 250 parts of pyridine and oxidised with a solution of 30 parts of copper sulphate in 50 parts of water and excess ammonia. When the colour of the dye has been completely discharged the cooled reaction mixture is slowly acidified with dilute hydrochloric acid and the precipitated triazole is filtered off, washed with water, and after conversion to the sodium salt, recrystallised from aqueous ethanol.

Example 15

The compound of formula

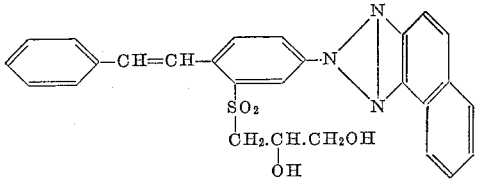

is prepared as follows:

A solution of 16.65 parts of 4-amino-2-(β,γ-dihydroxy-propyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 7.15 parts of β-naphthylamine and 5 parts of hydrochloric acid in 100 parts of water and a solution of 50 parts of sodium acetate in 100 parts of water is added.

On completion of the coupling, the dye is filtered off and washed with dilute hydrochloric acid.

The damp dyestuff is dissolved in 200 parts of pyridine and refluxed with a solution of 30 parts of copper sulphate in 50 parts of water and excess ammonia until the colour of the dyestuff is completely discharged. On cooling the reaction mixture, the crude triazole is precipitated. It is filtered off, washed with water and recrystallised from acetic acid.

*Example 16*

The compound of formula

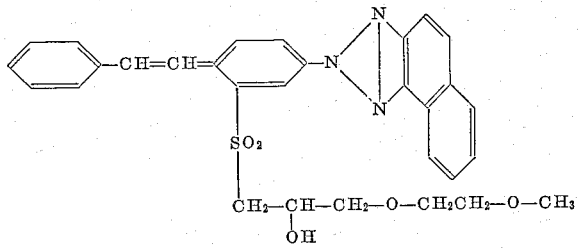

is prepared as follows:

A solution of 19.55 parts of 4-amino-2-(β-hydroxy-4′,7′-dioxa-octyl-sulphonyl)-stilbene in 150 parts of acetone is acidified by the addition of 12.5 parts of hydrochloric acid and directly diazotised with an aqueous solution of 3.45 parts of sodium nitrite at 8–10° C.

The diazonium compound is coupled with a solution of 7.15 parts of β-naphthylamine and 5 parts of hydrochloric acid in 100 parts of water and a solution of 50 parts of sodium acetate in 100 parts of water added. After the coupling the dye is filtered off and washed with dilute hydrochloric acid. The damp dyestuff is dissolved in 250 parts of pyridine and refluxed with a solution of 30 parts of copper sulphate in 50 parts of water and excess ammonia until the colour of the dyestuff is completely discharged. The crude triazole is isolated by slow acidification of the stirred cooled reaction mixture with dilute hydrochloric acid. The product is filtered off, washed with water and recrystallised from aqueous ethanol.

*Example 17*

The compound of formula

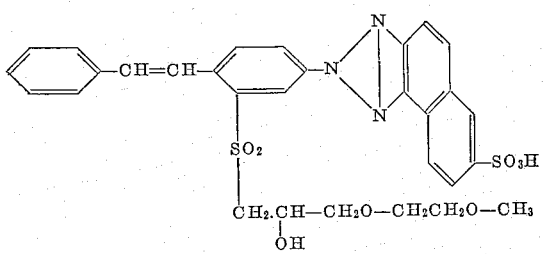

is prepared as follows:

A solution of 19.55 parts of 4-amino-2-(β-hydroxy-4′,7′-dioxa-octyl-sulphonyl)-stilbene in 150 parts of acetone is acidified by the addition of 12.5 parts of hydrochloric acid and directly diazotised wtih an aqueous solution of 3.45 parts of sodium nitrite.

The diazonium compound is coupled with a solution of 12.25 parts of sodium 2-naphthylamine-6-sulphonate in 200 parts of water. A solution of 50 parts of sodium acetate in 100 parts of water is added to maintain the pH of the solution at 7–8. On completion of the coupling, the dye is filtered off and washed with water.

The damp dyestuff is dissolved in 600 parts of 50% aqueous pyridine and refluxed with a solution of 30 parts of copper sulphate in 50 parts of water and excess ammonia until the red colour has been completely discharged. The cooled reaction mixture is slowly acidified with hydrochloric acid and the crude triazole filtered off, washed with water and recrystallised from n-butanol.

*Example 18*

5 parts of the product of Example 4, 3 parts of phthalic anhydride, 25 parts of N,N-dimethylformamide and 2.5 parts of pyridine are heated together at 100–120° C. for 30 minutes. The reaction mixture is mixed with 500 parts of water and made barely acid to Congo Red paper by the addition of hydrochloric acid. The mixture is filtered and the solid washed with water. 7.5 parts of a product is obtained which consists chiefly of material of the following formula:

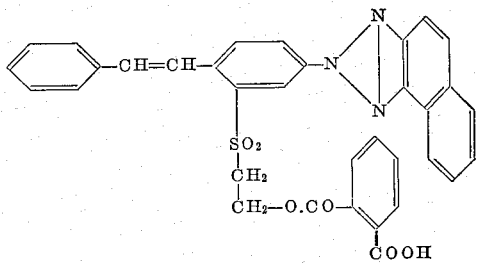

*Example 19*

5 parts of the product of Example 4 is dissolved in 40 parts of pyridine and 8 parts of chlorosulphonic acid added dropwise. The mixture is stirred for 1 hr. at room temperature and then for 1 hr. at 60° C. The mixture is diluted with 150 parts of water and acidified to Congo Red. The precipitate is coagulated by the addition of salt, filtered off and washed with water. 5 parts of a product is obtained consisting chiefly of material with the formula:

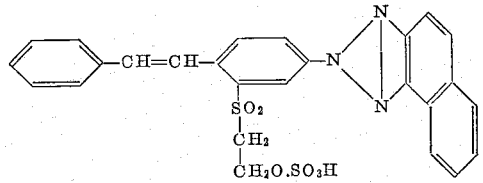

*Example 20*

5 parts of the product of Example 8 is dissolved in 40 parts of pyridine and 8 parts of chlorosulphonic acid is added dropwise. The mixture is stirred for 1 hour at room temperature and then for 1 hour at 60° C., and diluted with 150 parts of water. The mixture is acidified to Congo Red with hydrochloric acid and the precipitate filtered off and washed with water. The product obtained in this way consists chiefly of material with the formula:

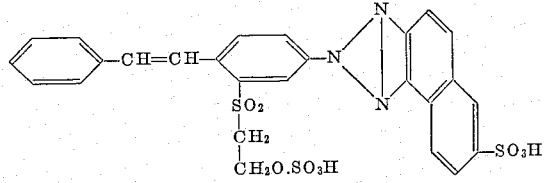

*Example 21*

5 parts of the product of Example 16 is dissolved in 40 parts of pyridine and 8 parts of chlorosulphonic acid is added dropwise. The mixture is stirred for 1 hr. at room temperature and then for 1 hour at 60° C., diluted with 150 parts of water and acidified to Congo Red with hydrochloric acid. The product which is filtered off consists chiefly of material with the formula:

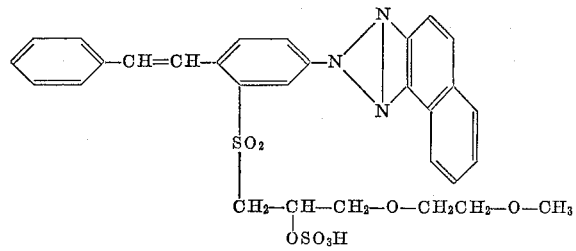

We claim:
1. The compound of the formula:

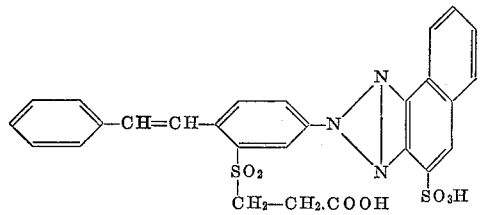

2. The compound of the formula:

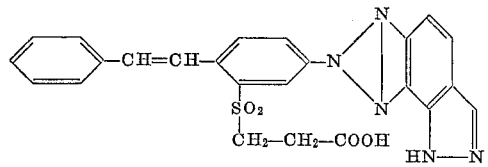

3. The compound of the formula:

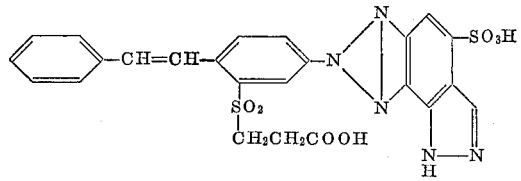

4. The compound of the formula:

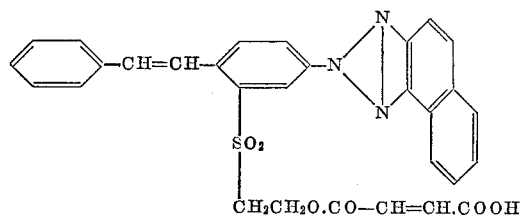

5. The compound of the formula:

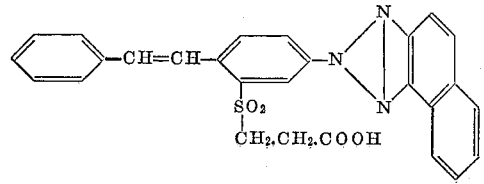

6. The compound of the formula:

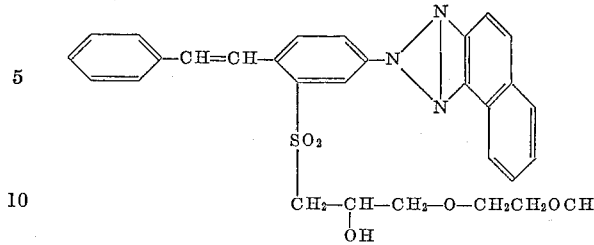

7. The compound of the formula:

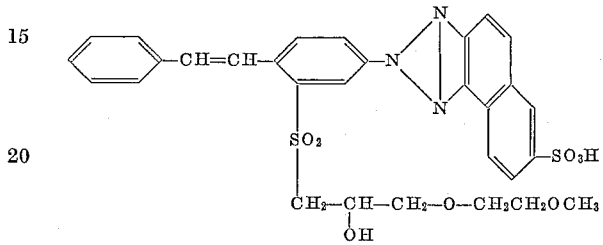

8. The compound of the formula:

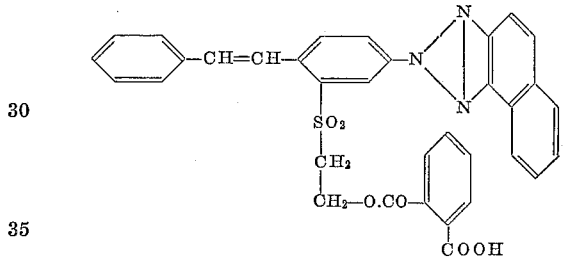

9. The compound of the formula:

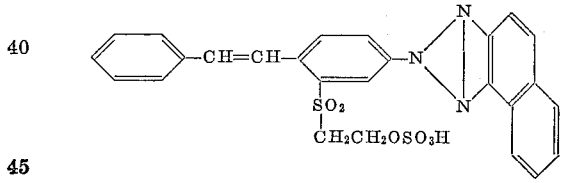

10. The compound of the formula:

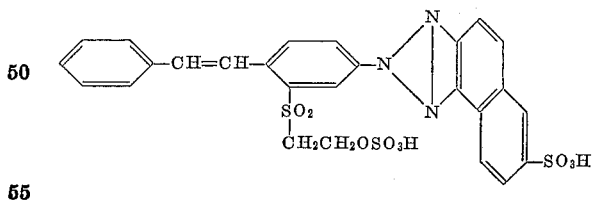

References Cited in the file of this patent
UNITED STATES PATENTS
2,784,184    Zweidler et al. _____ Mar. 5, 1957
FOREIGN PATENTS
565,237    Belgium _____ Mar. 15, 1958